(12) United States Patent
Zhang et al.

(10) Patent No.: US 12,481,458 B2
(45) Date of Patent: Nov. 25, 2025

(54) SYSTEMS AND METHODS FOR PREFETCHING DATA

(71) Applicant: Samsung Electronics Co., Ltd., Suwon-si (KR)

(72) Inventors: Tong Zhang, Mountain View, CA (US); Zongwang Li, Dublin, CA (US); Da Zhang, Fremont, CA (US); Byung Choi, Fremont, CA (US); Rekha Pitchumani, Oak Hill, VA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 11 days.

(21) Appl. No.: 18/227,739

(22) Filed: Jul. 28, 2023

(65) Prior Publication Data

US 2024/0377986 A1 Nov. 14, 2024

Related U.S. Application Data

(60) Provisional application No. 63/465,176, filed on May 9, 2023.

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
CPC ..... G06F 3/0611; G06F 3/0659; G06F 3/0673
See application file for complete search history.

(56) References Cited

U.S. PATENT DOCUMENTS

| | | | |
|---|---|---|---|
| 10,353,819 B2 | 7/2019 | Dwiel et al. | |
| 10,552,050 B1 | 2/2020 | Verdan et al. | |
| 11,449,428 B2 | 9/2022 | Benisty et al. | |
| 2016/0246726 A1 | 8/2016 | Hahn | |
| 2016/0350225 A1 | 12/2016 | Podaima et al. | |
| 2017/0168723 A1 | 6/2017 | Li et al. | |
| 2018/0173444 A1 | 6/2018 | Marcu et al. | |
| 2019/0129854 A1 | 5/2019 | Jo et al. | |
| 2019/0236018 A1 | 8/2019 | Kass | |
| 2020/0371970 A1* | 11/2020 | Chachad | G06F 13/1605 |
| 2021/0048959 A1* | 2/2021 | Murphy | G06F 3/0659 |

OTHER PUBLICATIONS

EPO Extended European Search Report dated Aug. 13, 2024, issued in European Patent Application No. 24172370.9 (12 pages).

* cited by examiner

*Primary Examiner* — Aracelis Ruiz
(74) *Attorney, Agent, or Firm* — Lewis Roca Rothgerber Christie LLP

(57) ABSTRACT

Systems and methods for prefetching data are disclosed. A processor in communication with a storage device identifies a first address. The processor identifies a first setting associated with the first address. The processor issues a first command to a first storage medium of the storage device based on the first setting. The first command is for performing a first type of memory read. The storage device is configured to retrieve first data associated with the first address in the first storage medium, to a second storage medium of the storage device, based on the first command.

20 Claims, 6 Drawing Sheets

SYSTEMS AND METHODS FOR PREFETCHING DATA

CROSS-REFERENCE TO RELATED APPLICATION(S)

The present application claims priority to and the benefit of U.S. Provisional Application No. 63/465,176, filed May 9, 2023, entitled "PREFETCHER FOR PERSISTENT MEMORY-THROUGH SPECULATIVE MEMORY READ," the entire contents of which are incorporated herein by reference.

FIELD

One or more aspects of embodiments according to the present disclosure relate to storage devices, and more particularly to prefetching data stored in a storage device.

BACKGROUND

An application may interact with a storage or memory device (collectively referenced as storage device) for reading (or loading) and writing (or storing) data. Latencies are generally involved in accessing the storage device. The type of latency involved may depend on the storage medium included in the storage device. Certain storage media have lower latencies than other storage media. Thus, it may be desirable to anticipate data to be accessed in a near future, and store the data in a lower latency storage media to improve overall system performance and responsiveness.

The above information disclosed in this Background section is only for enhancement of understanding of the background of the present disclosure, and therefore, it may contain information that does not form prior art.

SUMMARY

One or more embodiments of the present disclosure are directed to a computing system that includes a storage device, a processor configured to communicate with the storage device, and a memory coupled to the processor. The storage device includes a first storage medium and a second storage medium. The memory stores instructions that, when executed by the processor, cause the processor to: identify a first address; identify a first setting associated with the first address; and issue a first command to the first storage medium based on the first setting. The first command is for performing a first type of memory read. The storage device is configured to retrieve first data associated with the first address in the first storage medium, to the second storage medium, based on the first command.

In some embodiments, the first address is identified in a prefetch instruction included in a program executed by the processor.

In some embodiments, the first storage medium includes non-volatile memory, and the second storage medium includes volatile memory.

In some embodiments, the first type of memory read includes: issuing a first command to read data in the first address, wherein the processor is configured to issue a second command for a second function during an interval in which the first command is pending.

In some embodiments, the instructions further cause the processor to: identify a second address; identify a second setting associated with the second address; and issue a second command to the memory based on the second setting, wherein the second command is for performing a second type of memory read different from the first type of memory read, wherein the memory is configured to retrieve second data associated with the second address, based on the second command.

In some embodiments, the second type of memory read includes a blocking memory read of the second address.

In some embodiments, the storage device includes a queue for storing the first address.

In some embodiments, the storage device includes a controller configured to: retrieve the first address from the queue; retrieve the first data from the first storage medium based on the first address retrieved from the queue; and store the first data to the second storage medium.

In some embodiments, the first setting identifies a first prefetch strategy, wherein the first prefetch strategy is based on an access latency associated with the first storage device.

In some embodiments, the first setting is stored in a table containing a mapping of virtual addresses to physical addresses.

One or more embodiments of the present disclosure are directed to a method that includes: identifying, by a processor in communication with a storage device, a first address; identifying, by the processor, a first setting associated with the first address; and issuing, by the processor, a first command to a first storage medium of the storage device based on the first setting, wherein the first command is for performing a first type of memory read, wherein the storage device is configured to retrieve first data associated with the first address in the first storage medium, to a second storage medium of the storage device, based on the first command.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
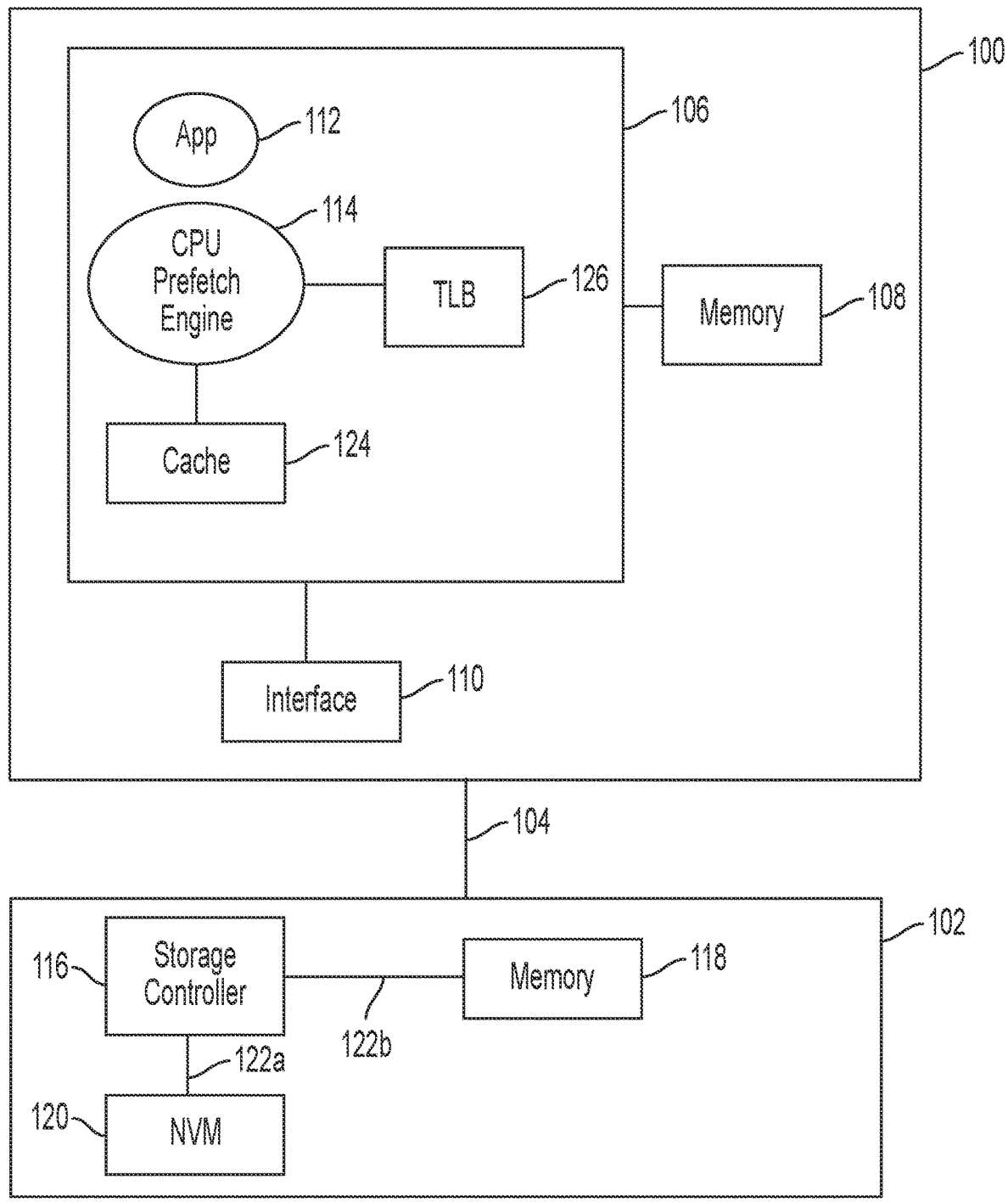
FIG. 1 depicts a block diagram of a system for prefetching data into a central processing unit (CPU) cache according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

In general terms an application running on a host computing device (referred to as a "host") may need to store and load data to and from a storage device. Latencies are generally involved in accessing the storage device. The latencies involved may differ depending on the storage medium storing the data that is to be retrieved. For example, the storage device may have both a volatile storage medium (e.g., dynamic random access memory (DRAM)) and a non-volatile storage medium (e.g., NAND flash memory). The latencies of the volatile storage medium may be lower than the latencies of the non-volatile storage medium. It may be desirable to use the volatile storage medium store a block, chunk, or page of data (collectively referred to as a "block") that is anticipated to be accessed by the host in the near future.

In general terms, embodiments of the present disclosure are directed to systems and methods for prefetching data from a storage device into a central processing unit (CPU) cache memory of the host. In some embodiments, the host includes a host prefetch engine configured to receive software prefetch instructions. The software prefetch instructions may be generated and inserted by a compiler into a program, during compilation of the program. In some embodiments, the host may also include a hardware prefetcher that may identify memory locations to be prefetched via a hardware mechanism, that may not require express prefetch instructions to be inserted into the program.

In some embodiments, the host prefetch engine is configured to prefetch data from an attached storage device (e.g., persistent memory device) in a way that minimizes data access latencies associated with the storage device. In some embodiments, data may also be prefetched from the host main memory (e.g., host DRAM), into the CPU cache. The same prefetch instruction may be used to prefetch data from the attached storage device or the host main memory. The prefetching of data into the CPU cache prior to the data being used by the program (e.g., for a computation), may help reduce memory access latencies and improve overall system responsiveness.

In some embodiments, the processing of the prefetch instruction (e.g., inserted into the program) may differ depending on the latencies and/or type of storage device from which data is to be prefetched. For example, prefetching data from the attached storage device via a memory read request may block the host processor from performing other tasks while waiting for the data to be returned. Due to the latencies that may be involved in retrieving data from the attached storage device, prefetching data from the device via a regular memory read request may result in inefficient use of the CPU. Such a concern may be lessened when data is prefetched from the host DRAM, as the host DRAM may have lower access latencies than the attached storage device.

In some embodiments, the host prefetch engine is configured to perform a non-blocking memory read (hereinafter referred to as a speculative memory read) that may allow the host processor to issue a read (or load) command, without waiting for data to be returned in response to the command. In some embodiments, the speculative memory read is processed by the attached storage device as a prefetch hint, for prefetching data from the device's non-volatile memory (NVM) into the device's cache memory. The host may follow the speculative memory read with a regular (e.g., blocking) memory read, for reading the prefetched data from the device's cache memory, into the CPU cache. Because the prefetched data may reside in the device's cache memory when the regular memory read is issued, the access latency of the regular memory read may be reduced.

In some embodiments, the host prefetch engine employs a regular memory read when prefetching data from the main memory. In this regard, it may not be necessary to issue a speculative memory read to the main memory since it is generally fast to retrieve data from the main memory.

In some embodiments, the host prefetch engine determines a prefetch strategy to use based on the address of the memory block to be prefetched. For example, if the memory block resides in the attached storage device that has an access latency higher than a given threshold, a speculative prefetch strategy (e.g., a speculative memory read followed by a regular memory read) may be employed. If the memory block resides in the main memory with an access latency lower than a given threshold, a regular prefetch strategy (e.g., a regular memory read without a preceding speculative memory read) may be employed.

As discussed, the prefetching of data from the NVM to the device cache memory via a speculative memory read helps reduce memory access latency during a regular memory read, which helps improve overall system performance and responsiveness. A user may also leverage the existing compiler to insert a prefetch instruction as it normally would, and leave it to the CPU prefetch engine to determine the appropriate prefetching strategy to use. This may eliminate the need to expose special data structures to the user, or the need for special operating system (OS) or runtime support, for executing the speculative prefetch strategy.

FIG. 1 depicts a block diagram of a system for prefetching data into a CPU cache according to one or more embodiments. The system may include a host computing device ("host") 100 coupled to an attached storage device 102 over one or more data communication links 104. In some embodiments, the data communication links 104 may include various general-purpose interfaces such as, for example, Ethernet, Universal Serial Bus (USB), and/or any wired or wireless data communication link.

The host 100 may include a processor 106, memory 108, and host interface 110. The processor 106 may be configured to run one or more applications 112 based on instructions stored in the memory 108. The application 112 may be any application configured to transmit requests (e.g., data access requests) to the storage device 102. For example, the application 112 may be a big data analysis application, e-commerce application, database application, machine learning application, and/or the like. Data requests such as, for example, load and store requests, may be generated during the running of the application 112. Results of the data requests may be used by the application 112 to generate an output.

The application 112 may communicate with the storage device 102 via the host interface 110. The host interface 110 may include physical connections as well as software instructions which may be executed by the processor 106. In some embodiments, the host interface 110 allows the host 100 and the storage device 102 to send and receive data using a protocol such as, for example, CXL, although embodiments are not limited thereto. Performance of the application 116 may depend on how fast requested data is retrieved by the storage device 102 and returned to the application.

In addition or in lieu of CXL, the host interface 110 may use other protocols such as Cache Coherent Interconnect for Accelerators (CCIX), dual in-line memory module (DIMM) interface, Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), iWARP protocol, InfiniBand protocol, 5G wireless protocol, Wi-Fi protocol, Bluetooth protocol, and/or the like.

In some embodiments, the processor 106 is further configured with a CPU prefetch engine 114 that is configured to prefetch data from the storage device 102 or the main memory 108, into a CPU cache 124. In some embodiments, the CPU cache 124 may include a level one cache (L1), level two cache (L2), and/or last level cache (LLC).

The prefetch strategy used by the CPU prefetch engine 114 for prefetching data into the CPU cache 124 may depend on the access latency associated with the storage device 102 if data is to be prefetched from the storage device 102, or the access latency associated with the memory 108 if data is to be prefetched from the memory. In some embodiments, a speculative prefetch strategy is employed if the data to be prefetched is located in the storage device 102 associated with a first access latency. The speculative prefetch strategy may include transmitting a speculative (non-blocking) memory read command, followed by a regular (blocking) memory read. The regular memory read may occur after prefetching of the data has been completed in response to the speculative memory read.

In some embodiments, the speculative memory read is non-blocking in that it does not require the storage device 102 to return data immediately in response to the speculative read command, and the CPU does not wait for the device to return the data. With the speculative memory read, the CPU does not need the data to continue execution. More specifically, the speculative memory read may not stall the CPU pipeline, and execution of other commands in the pipeline for other functions may proceed during an interval in which the speculative read command is awaiting completion (e.g., awaiting data to be returned).

In some embodiments, a regular memory read is blocking in that the CPU waits for the storage device 102 to return data to execute the instruction. Without the storage device returning the data, the CPU pipeline may stall, preventing execution of other functions while waiting for the read command to compete (e.g., waiting for data to be returned in response to the read command). The amount of time that the CPU pipeline will stall may depend on how fast the data is returned.

The speculative memory read and the regular memory read may be transmitted using, for example, the CXL.mem protocol. In some embodiments, a regular prefetch strategy is employed if the data to be prefetched is located in the memory 108 with a second access latency that is lower than the first access latency.

In some embodiments, a translation lookaside buffer (TLB) and/or page table (collectively referenced as TLB 126) may be extended to store, in an entry of the TLB, the prefetch strategy to be used. For example, a prefetch strategy bit in the entry may be set to "1" if the speculative prefetch strategy is to be used for prefetching data stored in the address represented by the entry, or set to "0" if a regular prefetch strategy is to be used. In some embodiments, in the event of a TLB miss, a page table is checked for the page table entry, and the TLB entry and the corresponding prefetch strategy bit is filled-in from the page table entry.

The storage device 102 may take the form of a solid state drive (SSD), persistent memory, and/or other attached storage device. In some embodiments, the storage device 102 includes (or is embodied as) an SSD with cache coherency and/or computational capabilities. In some embodiments, the storage device 102 includes (or is embodied as) a dual mode persistent memory with dual mode access to its storage space. In a first mode, the storage device 102 is accessible as disk storage (e.g., via CXL.io). In a second mode, the storage device 102 is accessible as a device-attached memory (e.g., via CXL.mem or CXL.cache).

In some embodiments, the storage device 102 includes a storage controller 116, storage memory 118, and non-volatile memory (NVM) 120. The storage memory 118 may be high-performing memory of the storage device 102, and may include (or may be) volatile memory, for example, such as DRAM, but the present disclosure is not limited thereto, and the storage memory 118 may be any suitable kind of high-performing volatile or non-volatile memory. Although a single storage memory 118 is depicted for simplicity sake, a person of skill in the art should recognize that the storage device 102 may include other local memory for temporarily storing other data for the storage device.

In some embodiments, the storage memory 118 is used and managed as cache memory. In this regard, the storage memory (also referred to as a device cache memory) 118 may store copies of data stored in the NVM 120. For example, data that is to be accessed by the application 112 in the near future may be copied from the NVM 120 to the storage memory 118 for allowing the data to be retrieved from the storage memory 118 instead of the NVM 120. In some embodiments, the storage memory 118 has a lower access latency than the NVM 120. Thus, in some embodiments, accessing data from the storage memory 118 helps improve overall system performance and responsiveness.

The NVM 120 may persistently store data received, for example, from the host 100. The NVM 120 may include, for example, one or more NAND flash memory, but the present disclosure is not limited thereto, and the NVM 120 may include any suitable kind of memory for persistently storing the data according to an implementation of the storage device 102 (e.g., magnetic disks, tape, optical disks, and/or the like).

The storage controller 116 may be connected to the NVM 120 and the storage memory 118 over one or more storage interfaces 122a, 122b (collectively referenced as 122). The storage controller 116 may receive input/output (I/O) requests (e.g. load or store requests) from the host 100, and transmit commands to and from the NVM 120 and/or storage memory 118 for fulfilling the I/O requests. In this regard, the storage controller 116 may include at least one processing component embedded thereon for interfacing with the host 100, the storage memory 118, and the NVM 120. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 118 or NVM 120 according to the data access instructions.

In some embodiments, the storage controller 116 receives and processes speculative and regular memory read commands from the host 100. The storage controller 116 may process a speculative memory read as a prefetch hint. In this regard, the storage controller 116 may retrieve data from the NVM 120 into the storage memory 118 in response to the speculative memory read.

In some embodiments, the storage controller 116 receives a regular memory read following the speculative memory read. The regular memory read may be for the same address as the speculative memory read. The data requested by the regular memory read may be retrieved from the storage memory 118 instead of the NVM 120, helping reduce memory access latency and improve overall system responsiveness.

In some embodiments, the speculative memory read is non-blocking command which allows the processor 106 to issue the command, and move to other processing tasks, without waiting for the storage device 102 to return data in response to the command. The speculative memory read may thus help prevent the host processor 106 from idly waiting for data to be returned (as would be the case for a regular memory read).

Figure 2:
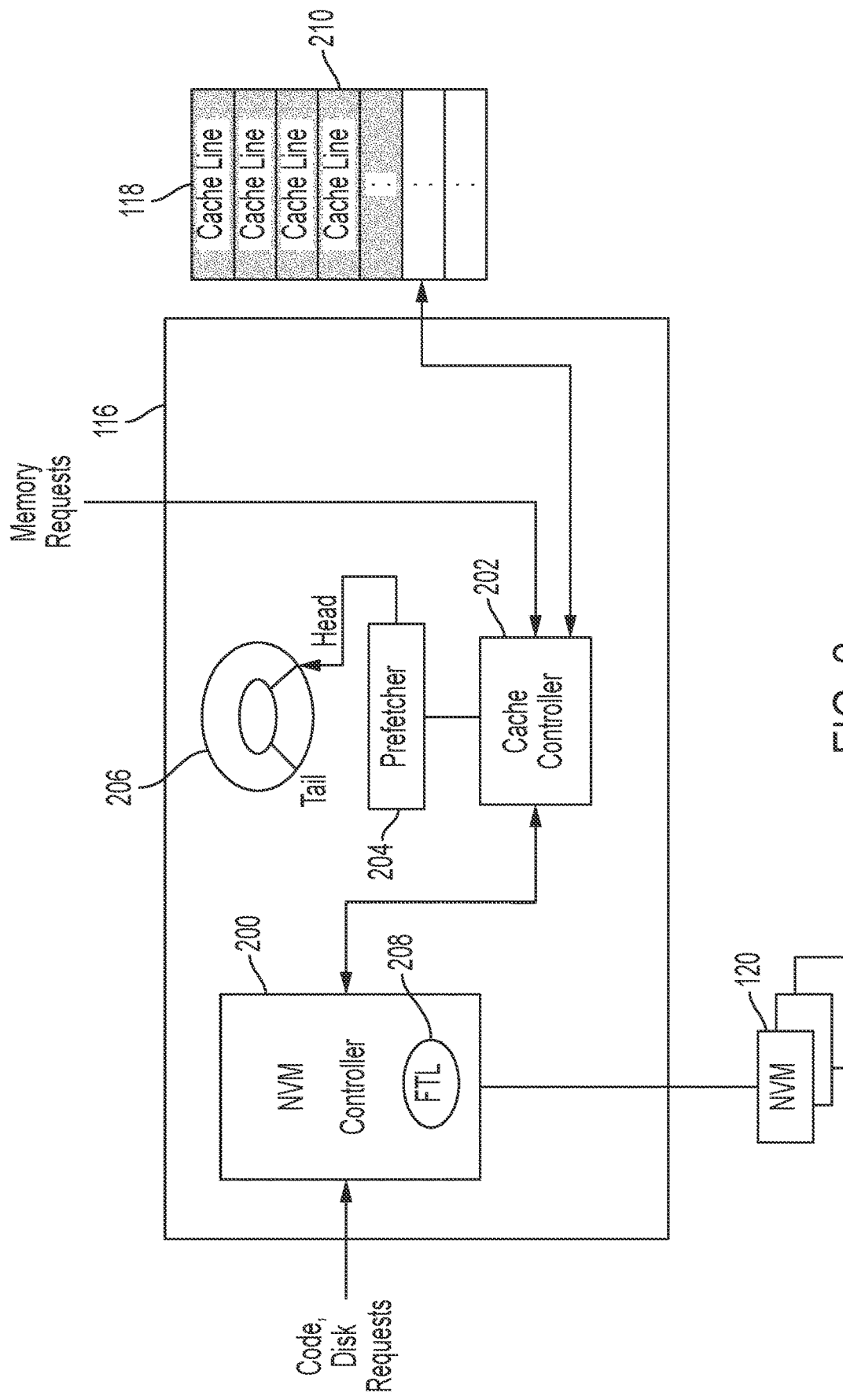
FIG. 2 depicts a block diagram of a storage controller according to one or more embodiments.

FIG. 2 depicts a block diagram of the storage controller 116 according to one or more embodiments. The storage controller 116 includes an NVM controller 200, cache controller 202, storage prefetch engine 204, and prefetch request queue 206. Although the NVM controller 200, cache controller 202, and storage prefetch engine 204 are assumed to be separate components, a person of skill in the art will recognize that one or more of the components may be combined or integrated into a single component, or further subdivided into further sub-components without departing from the spirit and scope of the inventive concept.

In some embodiments, the NVM controller 200, cache controller 202, and/or storage prefetch engine 204 may include, for example, a digital circuit (e.g., a microcontroller, a microprocessor, a digital signal processor, or a logic device (e.g., a field programmable gate array (FPGA), an application-specific integrated circuit (ASIC), and/or the like (collectively referenced as a processor)). The digital circuit may include a memory storing instructions (e.g., software, firmware, and/or hardware code) for being executed by the processor.

In some embodiments, the NVM controller 200 is configured to receive data access requests from the host 100. Using CXL as an example, the data access request may be a disk request based on a CXL.io protocol, that allows the NVM 120 to be accessed by the host CPU as disk storage. In some embodiments, the NVM controller 200 includes a flash translation layer (FTL) 208 that receives the data access request and interfaces with the NVM 120 to read data from, and write data to, the NVM. In this regard, the FTL 208 may translate a disk block address included in the data access request, to a flash block address. In doing so, the FTL 208 may engage in wear leveling to move data around the storage cells of the NVM 120 to evenly distribute the writes to the NVM 120.

Referring again to CXL as an example, the data access request may be a memory request based on a CXL.mem or CXL.cache protocol, that allows the NVM 120 to be accessed by the host CPU as a device-attached memory. In some embodiments, the memory access request is a speculative memory read. The speculative memory read may identify a memory address (e.g., a logical block address (LBA)). The cache controller 202 may forward the memory address to the storage prefetch engine 204. The storage prefetch engine 204 may be configured to manage a prefetch request queue 206. The memory address may be stored in the prefetch request queue 206 (e.g., in a location of the queue marked by a tail pointer).

In some embodiments, the storage prefetch engine 204 is configured to retrieve a memory address from the prefetch request queue 206, where the memory address identifies the data that is to be prefetched from the NVM 200 to the storage memory 118. The memory address may be retrieved from a location of the queue 206 that is marked by a head pointer. In some embodiments, the storage prefetch engine 204 communicates with the cache controller 202 for retrieving the data that is stored in the memory address. In this regard, the cache controller 202 may be communicate with the NVM controller 200 for accessing and returning the data from the NVM 120. In this regard, the cache controller 202 or the FTL 208 may be configured to translate a requested memory block address into a flash block address. The NMV controller 200 may retrieve the data from the flash block address, and forward the data to the cache controller 202. The cache controller may select a cache address (e.g., a cache line 210) to store the data, and store the data into the cache address.

Figure 3:
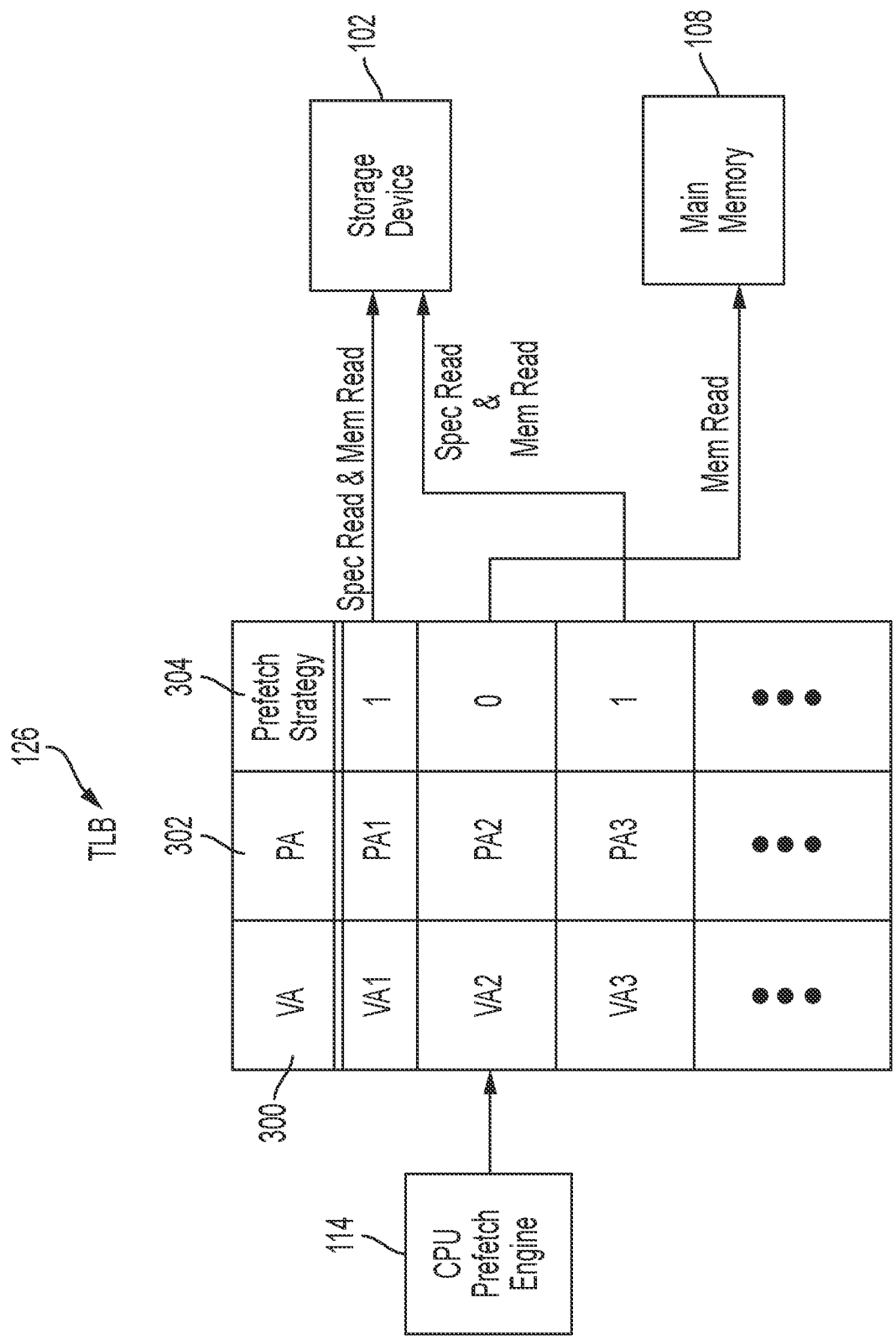
FIG. 3 depicts a conceptual diagram of a CPU prefetch engine employing a different prefetch strategy based on information stored in a translation lookaside buffer according to one or more embodiments.

FIG. 3 depicts a conceptual diagram of the CPU prefetch engine 114 employing a different prefetch strategy based on information stored in the TLB 126 according to one or more embodiments. In some embodiments, the TLB 126 includes a mapping of a virtual address 300 to a physical address 302. In some embodiments, the TLB 126 is extended to include a prefetch strategy bit (e.g., a setting) 304 that may determine the type of prefetch strategy to employ. For example, the speculative prefetch strategy may be used if the prefetch strategy bit is set, and a regular prefetch strategy may be used if the prefetch strategy is not set.

In some embodiments, the CPU prefetch engine 114 identifies a memory address (e.g., a virtual address) from which data is to be prefetched. The memory address may be identified by a software based prefetch instruction inserted by the compiler into a program that is executed by an application 112. The software based prefetch instruction may be the same regardless of the type of prefetch strategy that is to be employed, or the memory device from which data is to be prefetched. In some embodiments, the address to be prefetched may be identified via a hardware mechanism by the CPU prefetch engine 114 or by a separate hardware prefetcher (not shown).

In some embodiments, the CPU prefetch engine 114 determines a physical address 302 associated with an identified virtual address 300. The CPU prefetch engine 114 may further retrieve the speculative prefetch strategy bit 304 corresponding to the virtual and physical addresses. If the prefetch strategy bit 304 is set (e.g., value is "1"), the CPU prefetch engine 114 may issue a speculative read command (e.g., to the storage device 102) for the identified physical address, followed by a regular memory read command for the same physical address. If the prefetch strategy bit 304 is not set (e.g., value is "0"), the CPU prefetch engine 114 may issue a regular read command (e.g., to the main memory 108) for the identified physical address.

Although not depicted in FIG. 3, a separate table may be used to map memory addresses to the memory devices (e.g., the storage device 102 or the main memory 108) accessible to the host, to allow the CPU prefetch engine 114 to issue the command to the appropriate memory device (e.g., the storage device 102 or the main memory 108). In this regard, the prefetch strategy bit 304 indicates the type of memory read command to issue (e.g., speculative or regular), and need not differentiate between the different type of memory devices. Thus, in scenarios where the latency of the storage device 102 is the same as the main memory 108, the prefetch strategy for memory addresses in the storage device 102 may be set to "0" to indicate use of the regular prefetch strategy.

In some embodiments, the prefetch strategy bit 304 is populated by the operating system (e.g., during initialization of the page table). The strategy bit 304 may be determined based on performance characteristics of the memory devices 102, 108. For example, the speculative prefetch strategy may be selected for the memory addresses in the storage device 102, based on determining that the access latency of the storage device is higher than a threshold value. The regular prefetch strategy may be selected for memory addresses in the main memory 108, based on determining that the access latency of the main memory is smaller than the threshold value.

Figure 4:
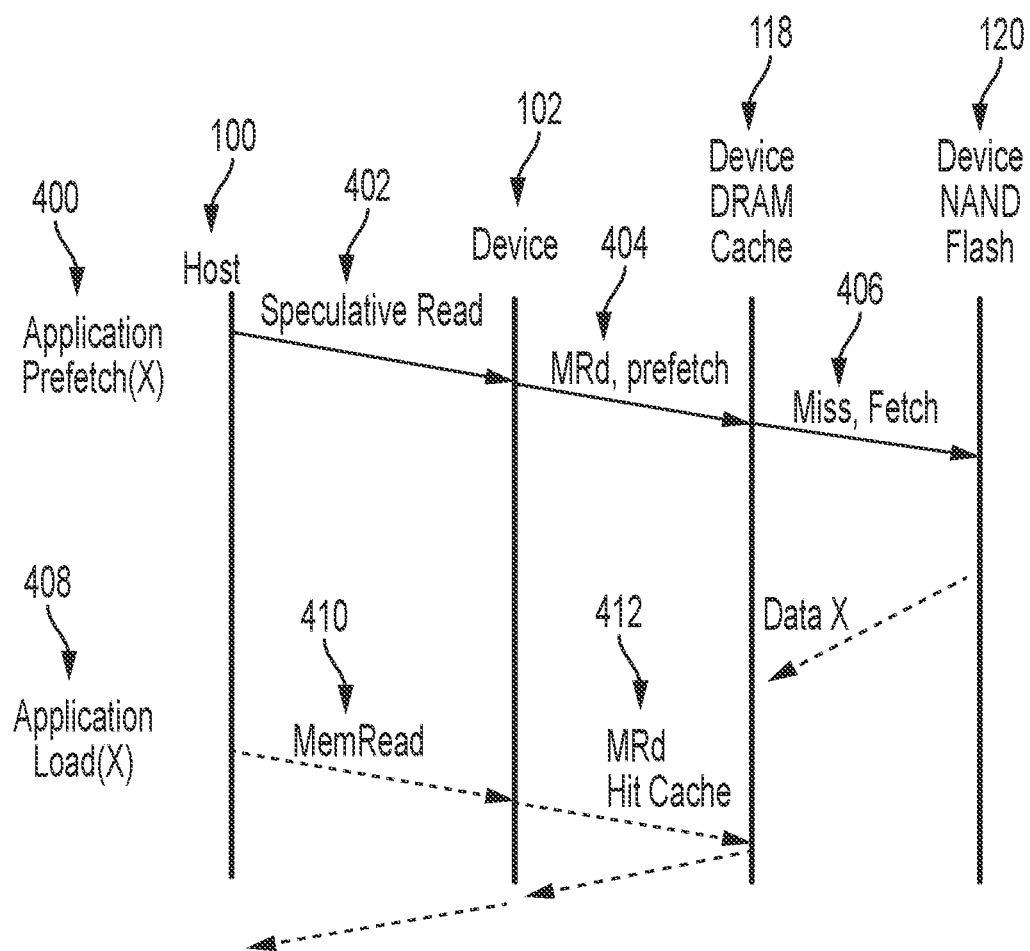
FIG. 4 depicts an example data flow for prefetching data from a storage device according to one or more embodiments.

FIG. 4 depicts an example data flow for prefetching data from the storage device 102 according to one or more embodiments. A program run by an application 112 may include a prefetch instruction for data block X 400. The prefetch instruction 400 may cause the host 100 (e.g., via the CPU prefetch engine 114) to transmit a speculative memory read 402 to the storage device 102. In some embodiments, the speculative memory read is a non-blocking memory read that allows the processor 106 in the host 100 to issue the read command without waiting for data to be returned in response to the command. Thus, the processor 106 may be free to execute other instructions after transmitting the speculative read command.

In some embodiments, the storage device 102 interprets the speculative read command as a prefetch hint. In this regard, the storage device 102 may issue a memory read 404 to the storage memory 118. In the event that the memory read results in a cache miss 406, the storage device 120 fetches the data from the NVM 120, and stores the data in the storage memory 118.

When the program run by the application issues a load request for data block X 408 (or when the CPU prefetch cache 114 issues a regular memory read following the speculative memory read for prefetching purposes), the host 100 may issue a regular memory read 410 to the storage device 102. The storage device may issue a memory read 412 to the storage 118. Because the requested data has been prefetched to the storage memory 118, a cache hit results, allowing the data to be returned with a lower latency than when data is retrieved from the NVM 120.

Figure 5:
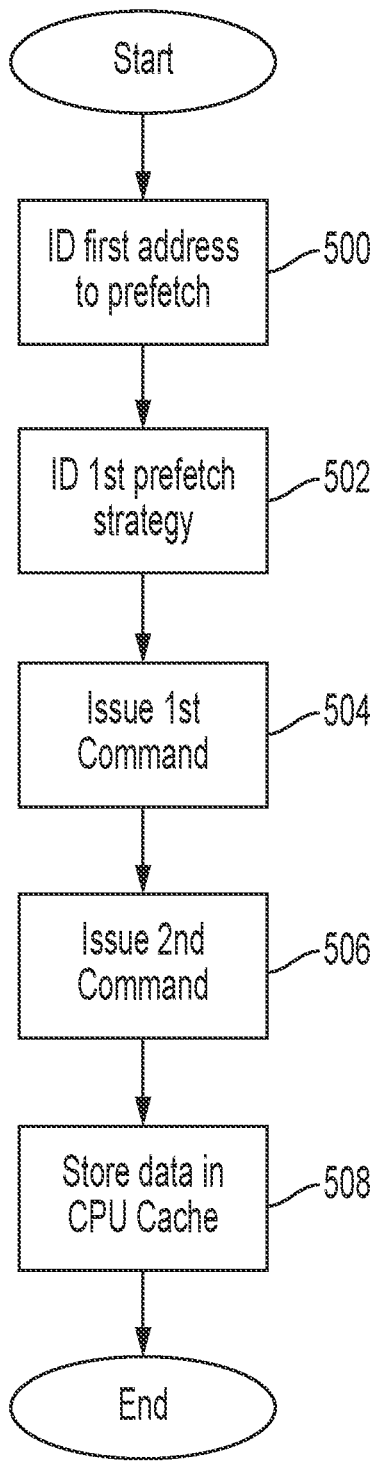
FIG. 5 depicts a flow diagram of a process for prefetching data from a storage device into a CPU cache according to one or more embodiments.

FIG. 5 depicts a flow diagram of a process for prefetching data from the storage device 102 into the CPU cache 124 according to one or more embodiments. The process starts, and in act 500, the CPU prefetch engine 114 identifies a memory address (e.g., a first address) storing data (e.g., first data) to be prefetched. The address may be included in a prefetch instruction included in a program executed by an application running 112 on the host processor 106. In some embodiments the prefetch instruction may be the same regardless of the prefetch strategy that is to be employed, or the memory device from where data is to be prefetched. In some embodiments, the memory address is a virtual memory address. In embodiments where the processor includes a hardware prefetch engine, the address to be prefetched is provided by the hardware prefetch engine.

In act 502, the CPU prefetch engine 114 identifies a prefetch strategy (e.g., a first setting) associated with the address. In this regard, the CPU prefetch engine 114 accesses the TLB 126 to determine the value of the prefetch strategy bit 304 for the address to be prefetched. If the prefetch strategy bit 304 is set to "1," the CPU prefetch engine 114 may determine that the prefetch strategy to be used is the speculative prefetch strategy.

In act 504, the CPU prefetch engine 114 issues a first command to the appropriate memory device based on the identified prefetch strategy bit 304. For example, if the identified prefetch strategy is the speculative prefetch strategy, the CPU prefetch engine 114 may issue a speculative memory read command (e.g., via the CXL.mem protocol). In some embodiments, the storage device 102 receives the speculative read command and retrieves first data associated with the address from the NVM 120 (e.g., the first storage medium) to the storage memory 118 (e.g., the second storage medium). In some embodiments, the storage device 102 may first check the storage memory 118 for determining whether the data to be prefetched is already there. Because the speculative memory read command is a non-blocking command, the CPU may be free to execute other instructions without waiting to receive a response from the memory device.

In act 506, if the identified prefetch strategy is the speculative prefetch strategy, the CPU prefetch engine 114 may issue a regular read command for the memory address, as a second command (e.g., via the CXL.mem protocol). The read command may be processed by the storage device 102, and the requested data returned to the host 100. In some embodiments, because the speculative read command in act 504 allows the data to be retrieved from the NVM 120 into the storage memory 118, the regular read command allows the data to be retrieved from the storage memory 118 in a faster manner than what it would have taken to retrieve the data from the NVM.

In act 508, the retrieved data is stored in the CPU cache 124, allowing the data to be quickly returned to the requesting program when the program makes a request for the data (e.g., to perform a computation function).

Figure 6:
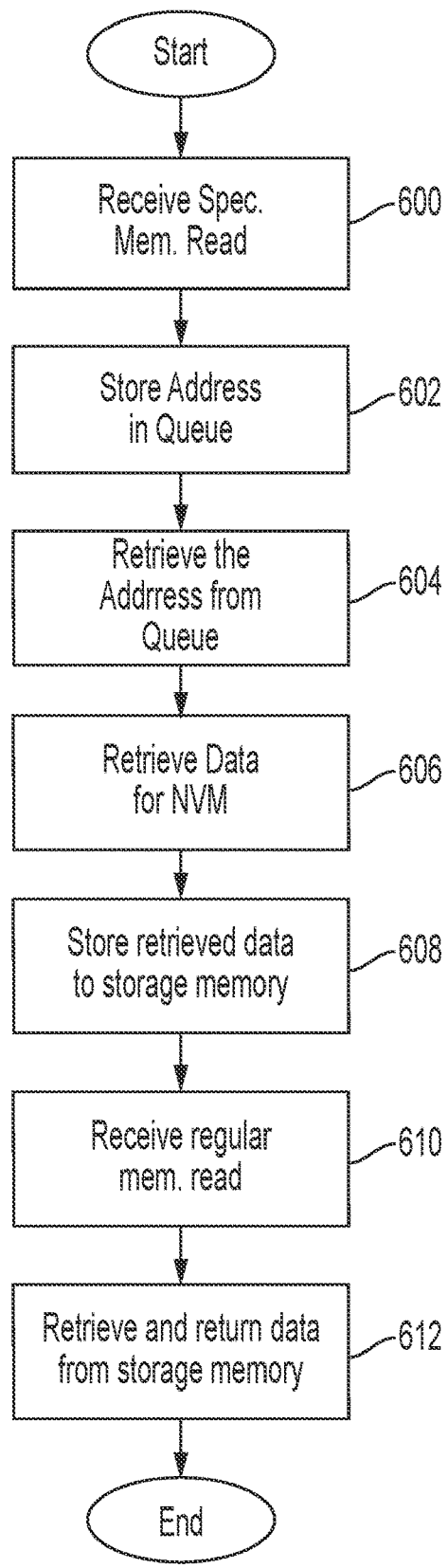
FIG. 6 depicts a flow diagram of a process for processing memory read commands from a host according to one or more embodiments.

FIG. 6 depicts a flow diagram of a process for processing memory read commands from the host 100 according to one or more embodiments. In act 600, the storage device 102 (e.g., cache controller 202) receives a speculative memory read command. In some embodiments, the cache controller 202 is configured to interpret the speculative memory read command as a prefetch hint.

In act 602, a memory address is retrieved from the command, and provided to, for example, the storage prefetch engine 204 for storing the address into the prefetch request queue 206. The storage prefetch engine 204 may be configured to identify a tail pointer of the queue, and insert the address into the location identified by the tail pointer.

The storage prefetch engine 204 may further be configured to process addresses from the prefetch request queue 206, to prefetch data stored in the addresses. In act 604, the storage prefetch engine 204 retrieves the address located at the head of the queue. The address may be provided to the cache controller 202 for prefetching. In some embodiments, the cache controller 202 determines whether the data stored in the address is already located in the storage memory 118 prior to fetching the data from the NVM 120. If the data is already stored in the storage memory 118, the cache controller 202 may ignore or drop the prefetch address.

If the data is not already stored in the storage memory 118, the cache controller 202 may, in act 606, communicate with the NVM controller 200 for retrieving the data from the NVM 120. In some embodiments, the FTL 208 in the NVM controller 200 may identify a flash block address associated with the address retrieved from the queue 206. The data may then be retrieved from the flash block address.

In act 608, the cache controller 202 stores the data retrieved from the NVM 120, into the storage memory 118. In this regard, the cache controller 202 identifies a cache line 210 in which the data is to be stored, and stores the data in the identified cache line.

In act 610, the cache controller 202 receives a regular memory read request for the data from the host 100. In act 202, the cache controller 202 checks the storage memory 118 for determining whether the data is in the storage memory 118 (e.g., a cache hit). In act 612, the data is retrieved from the storage memory 118 and provided to the host 100 for storing, for example, in the CPU cache 124.

It should be appreciated that the systems and methods for prefetching data described herein provide various advantages, including: 1) they allow the use of prefetch instructions to send prefetch hints to the storage device; 2) they help reduce memory access latency and improve overall system performance and responsiveness due to the reduced memory access latency; 3) no special OS, runtime support, or data structures are needed for effectuating the data prefetch; 4) the same prefetch instruction that may be used by the complier may be used for prefetching data via a speculative memory read; and 5) existing compiler optimizations and heuristics already in place for prefetching data may be used for prefetching data using speculative memory reads.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for prefetching data have been specifically described and illustrated herein, many modifications and variations will be apparent to those skilled in the art. Accordingly, it is to be understood that systems and methods for prefetching data constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1. A computing system comprising: a storage device including a first storage medium and a second storage medium; a processor configured to communicate with the storage device; a memory coupled to the processor, the memory storing instructions that, when executed by the processor, cause the processor to: identify a first address; identify a first setting associated with the first address; and issue a first command to the first storage medium based on the first setting, wherein the first command is for performing a first type of memory read, wherein the storage device is configured to retrieve first data associated with the first address in the first storage medium, to the second storage medium, based on the first command.

Statement 2. The computing system of Statement 1, wherein the first address is identified in a prefetch instruction included in a program executed by the processor.

Statement 3. The computing system of Statement 1, wherein the first storage medium includes non-volatile memory, and the second storage medium includes volatile memory.

Statement 4. The computing system of Statement 1, wherein the first type of memory read includes: issuing a first command to read data in the first address, wherein the processor is configured to issue a second command for a second function during an interval in which the first command is pending.

Statement 5. The computing system of Statement 1, wherein the instructions further cause the processor to: identify a second address; identify a second setting associated with the second address; and issue a second command to the memory based on the second setting, wherein the second command is for performing a second type of memory read different from the first type of memory read, wherein the memory is configured to retrieve second data associated with the second address, based on the second command.

Statement 6. The computing system of Statement 5, wherein the second type of memory read includes a blocking memory read of the second address.

Statement 7. The computing system of Statement 1, wherein the storage device includes a queue for storing the first address.

Statement 8. The computing system of Statement 7, wherein the storage device includes a controller configured to: retrieve the first address from the queue; retrieve the first data from the first storage medium based on the first address retrieved from the queue; and store the first data to the second storage medium.

Statement 9. The computing system of Statement 1, wherein the first setting identifies a first prefetch strategy, wherein the first prefetch strategy is based on an access latency associated with the first storage device.

Statement 10. The computing system of Statement 1, wherein the first setting is stored in a table containing a mapping of virtual addresses to physical addresses.

Statement 11. A method comprising: identifying, by a processor in communication with a storage device, a first address; identifying, by the processor, a first setting associated with the first address; and issuing, by the processor, a first command to a first storage medium of the storage device based on the first setting, wherein the first command is for performing a first type of memory read, wherein the storage device is configured to retrieve first data associated with the first address in the first storage medium, to a second storage medium of the storage device, based on the first command.

Statement 12. The method of Statement 11, wherein the first address is identified in a prefetch instruction included in a program executed by the processor.

Statement 13. The method of Statement 11, wherein the first storage medium includes non-volatile memory, and the second storage medium includes volatile memory.

Statement 14. The method of Statement 11, wherein the first type of memory read includes: issuing a first command to read data in the first address, wherein the processor is configured to issue a second command for a second function during an interval in which the first command is pending.

Statement 15. The method of Statement 11 further comprising: identifying a second address; identifying a second setting associated with the second address; and issuing a second command to a memory coupled to the processor based on the second setting, wherein the second command is for performing a second type of memory read different from the first type of memory read, wherein the memory retrieves second data associated with the second address, based on the second command.

Statement 16. The method of Statement 15, wherein the second type of memory read includes a blocking memory read of the second address.

Statement 17. The method of Statement 11, wherein the storage device includes a queue for storing the first address.

Statement 18. The method of Statement 17, wherein the storage device includes a controller, wherein the controller: retrieves the first address from the queue; retrieves the first data from the first storage medium based on the first address retrieved from the queue; and stores the first data to the second storage medium.

Statement 19. The method of Statement 11, wherein the first setting identifies a first prefetch strategy, wherein the first prefetch strategy is based on an access latency associated with the first storage device.

Statement 20. The method of Statement 11, wherein the first setting is stored in a table containing a mapping of virtual addresses to physical addresses.

What is claimed is:

1. A computing system comprising:
a storage device including:
  a first storage medium, and
  a second storage medium;
a processor configured to communicate with the storage device;
a memory coupled to the processor, the memory storing instructions that, when executed by the processor, cause the processor to:
  identify a first address;
  identify a first prefetch strategy associated with the first address; and
  issue a first command to the first storage medium based on the first prefetch strategy, wherein the first command is for performing a first type of prefetch, wherein the storage device is configured to retrieve first data associated with the first address in the first storage medium, to the second storage medium, based on the first command;

identify a second address;

identify a second prefetch strategy associated with the second address, the second prefetch strategy being different from the first prefetch strategy; and issue a second command to the memory based on the second prefetch strategy, wherein the second command is for performing a second type of prefetch, wherein the memory is configured to retrieve second data associated with the second address based on the second command.

2. The computing system of claim 1, wherein the first address is identified in a prefetch instruction included in a program executed by the processor.

3. The computing system of claim 1, wherein the first storage medium includes non-volatile memory, and the second storage medium includes volatile memory.

4. The computing system of claim 1, wherein the first type of memory read includes:

issuing a first command to read data in the first address, wherein the processor is configured to issue a second command for performing a function during an interval in which the first command is pending.

5. The computing system of claim 1, wherein the first prefetch strategy is associated with a first type of memory read, and the second prefetch strategy is associated with a second type of memory read different from the first type of memory read.

6. The computing system of claim 5, wherein the second type of memory read includes a blocking memory read of the second address.

7. The computing system of claim 1, wherein the storage device includes a queue for storing the first address.

8. The computing system of claim 7, wherein the storage device includes a controller configured to:

retrieve the first address from the queue;

retrieve the first data from the first storage medium based on the first address retrieved from the queue; and store the first data to the second storage medium.

9. The computing system of claim 1, wherein the first prefetch strategy is based on an access latency associated with the first storage medium.

10. The computing system of claim 1, wherein a value indicative of the first prefetch strategy is stored in a table containing a mapping of virtual addresses to physical addresses.

11. A method comprising:

identifying, by a processor in communication with a storage device, a first address;

identifying, by the processor, a first prefetch strategy associated with the first address; and issuing, by the processor, a first command to a first storage medium of the storage device based on the first prefetch strategy, wherein the first command is for performing a first type of prefetch, wherein the storage device is configured to retrieve first data associated with the first address in the first storage medium, to a second storage medium of the storage device, based on the first command;

identifying, by the processor, a second address;

identifying, by the processor, a second prefetch strategy associated with the second address, the second prefetch strategy being different from the first prefetch strategy; and issuing, by the processor, a second command to a memory coupled to the processor based on the second prefetch strategy, wherein the second command is for performing a second type of prefetch, wherein the memory is configured to retrieve second data associated with the second address based on the second command.

12. The method of claim 11, wherein the first address is identified in a prefetch instruction included in a program executed by the processor.

13. The method of claim 11, wherein the first storage medium includes non-volatile memory, and the second storage medium includes volatile memory.

14. The method of claim 11, wherein the first type of memory read includes:

issuing a first command to read data in the first address, wherein the processor is configured to issue a second command for performing a function during an interval in which the first command is pending.

15. The method of claim 11, wherein the first prefetch strategy is associated with a first type of memory read, and the second prefetch strategy is associated with a second type of memory read different from the first type of memory read.

16. The method of claim 15, wherein the second type of memory read includes a blocking memory read of the second address.

17. The method of claim 11, wherein the storage device includes a queue for storing the first address.

18. The method of claim 17, wherein the storage device includes a controller, wherein the controller:

retrieves the first address from the queue;

retrieves the first data from the first storage medium based on the first address retrieved from the queue; and stores the first data to the second storage medium.

19. The method of claim 11, wherein the first prefetch strategy is based on an access latency associated with the first storage medium.

20. The method of claim 11, wherein a value indicative of the first prefetch strategy is stored in a table containing a mapping of virtual addresses to physical addresses.

* * * * *